United States Patent
Houlberg et al.

(10) Patent No.: US 7,088,826 B2
(45) Date of Patent: *Aug. 8, 2006

(54) METHOD FOR PROVIDING A CRYPTO KEY AND CHECKWORD TO AN ENCRYPTION DEVICE

(75) Inventors: Christian L Houlberg, Ventura, CA (US); Gary S. Borgen, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 183 days.

This patent is subject to a terminal disclaimer.

(21) Appl. No.: 10/928,875

(22) Filed: Aug. 19, 2004

(65) Prior Publication Data

US 2005/0036625 A1   Feb. 17, 2005

Related U.S. Application Data

(63) Continuation of application No. 09/505,830, filed on Feb. 17, 2000, now Pat. No. 6,859,537.

(51) Int. Cl.
*H04L 9/00*   (2006.01)

(52) U.S. Cl. .................. 380/277; 380/278; 380/279; 380/280; 713/193

(58) Field of Classification Search ........ 380/277–280; 244/159, 172, 3.1; 713/193
See application file for complete search history.

(56) References Cited

U.S. PATENT DOCUMENTS

| | | | | |
|---|---|---|---|---|
| 4,465,901 A | * | 8/1984 | Best | 713/190 |
| H1414 H | * | 2/1995 | Borgen | 713/193 |
| 5,458,041 A | * | 10/1995 | Sun et al. | 89/1.11 |
| 5,481,610 A | * | 1/1996 | Doiron et al. | 380/270 |
| 5,513,261 A | * | 4/1996 | Maher | 380/277 |
| 5,654,698 A | * | 8/1997 | Snelgrove et al. | 340/870.01 |
| 6,859,537 B1 | * | 2/2005 | Houlberg et al. | 380/277 |
| 6,968,061 B1 | * | 11/2005 | Houlberg et al. | 380/277 |

* cited by examiner

*Primary Examiner*—Kim Vu
*Assistant Examiner*—Beemnet W Dada
(74) *Attorney, Agent, or Firm*—David S. Kalmbaugh

(57) ABSTRACT

A method for storing a crypto key and an associated checkword of the crypto key stored in a non-volatile memory within a micrcontroller and then providing the crypto key and associated checkword to an encryption device. The method next loads the crypto key and associated checkword into the encryption device.

20 Claims, 8 Drawing Sheets

US 7,088,826 B2

METHOD FOR PROVIDING A CRYPTO KEY AND CHECKWORD TO AN ENCRYPTION DEVICE

This application is a continuation of U.S. patent application Ser. No. 09/505,830, filed Feb. 17, 2000 now U.S. Pat. No. 6,859,537.

BACKGROUND OF THE INVENTION

1. Field of the Invention

The present invention relates generally to a non-volatile memory interface for use with an encryption device. More particularly, the present invention relates a method which uses a Non-Volatile memory circuit connected to an encryption device for storing the crypto key and the key loader for the encryption device.

2. Description of the Prior Art

The encryption device used for encrypting data to be transmitted to a ground station via a missile's telemetry system requires a crypto key to be loaded in the encryption device to permit the encryption of the data. The standard key loaders used by the military for crypto key loading are the KOI-18 and the KYK-13. The KOI-18 is a paper type reader that serially outputs the crypto key data and clock as a series of electrical pulses. The KYK-13 is an electrical device that can store up to three crypto keys with their corresponding check word. The KYK-13 outputs data in a manner which is similar to the KOI-18.

The missile's telemetry system encryption device includes a Non-Volatile Memory circuit which receives the crypto key and check word from the key loader. Upon receiving the crypto key and check word the Non-Volatile Memory circuit will load the encryption device with the crypto key and also display the status of a load. When power is removed from the encryption device, only the Non-Volatile Memory circuit will retain the key data including the crypto key. When power is re-applied to the encryption system, the Non-Volatile Memory circuit automatically reloads the encryption device with the key data. The crypto key will remain in the Non-Volatile Memory circuit until the key is erased from the circuit.

While the Non-Volatile Memory circuit used in the past perform their intended function of key data storage adequately, these circuits generally require substantially more space than is currently available on today's state of the art missile encryption systems. There is now a need to significantly reduce the size of Non-Volatile Memory circuit used with a missile's telemetry system encryption device.

SUMMARY OF THE INVENTION

The present invention overcomes some of the difficulties of the prior art including those mentioned above in that it comprises a relatively simple in design yet highly effective Non-Volatile Memory circuit for use with a missile's telemetry encryption system.

The present invention comprises a Non-Volatile Memory circuit which functions as an interface between a key loader and an encryption device. Included in the Non-Volatile Memory circuit is a Flash/EEPROM 8-bit Microcontroller which has an EEPROM suitable for storage of a crypto key and its corresponding checkword and also a backup crypto key and checkword. Connected to the microcontroller is a 4 MHz clock signal generator which supplies the master clock signal to the microcontroller. A pair of light emitting diodes are also connected to the micrcontroller to indicate the status of a load of the crypto key and checkword within the microcontroller as well as the status of an erase of the crypto key and checkword from the microcontroller. The microcontroller is also connected to the telemeter transmitter for the missile. This allows the micrcontroller to turn off the transmitter during a key load which prevents transmission of the crypto key and its corresponding checkword.

When the microcontroller completes a load of the crypto key from its internal EEPROM to the encryption device and upon launch of the missile, the software within the microcontroller erases the crypto key and its corresponding checkword from its EEPROM. This prevents an enemy force from retrieving the crypto key and its corresponding checkword from the missile after launch. The microcontroller can also erase the crypto key and its corresponding checkword from its EEPROM upon receiving an active erase signal from the missile.

DETAILED DESCRIPTION OF THE PREFERRED EMBODIMENT

Figure 1:
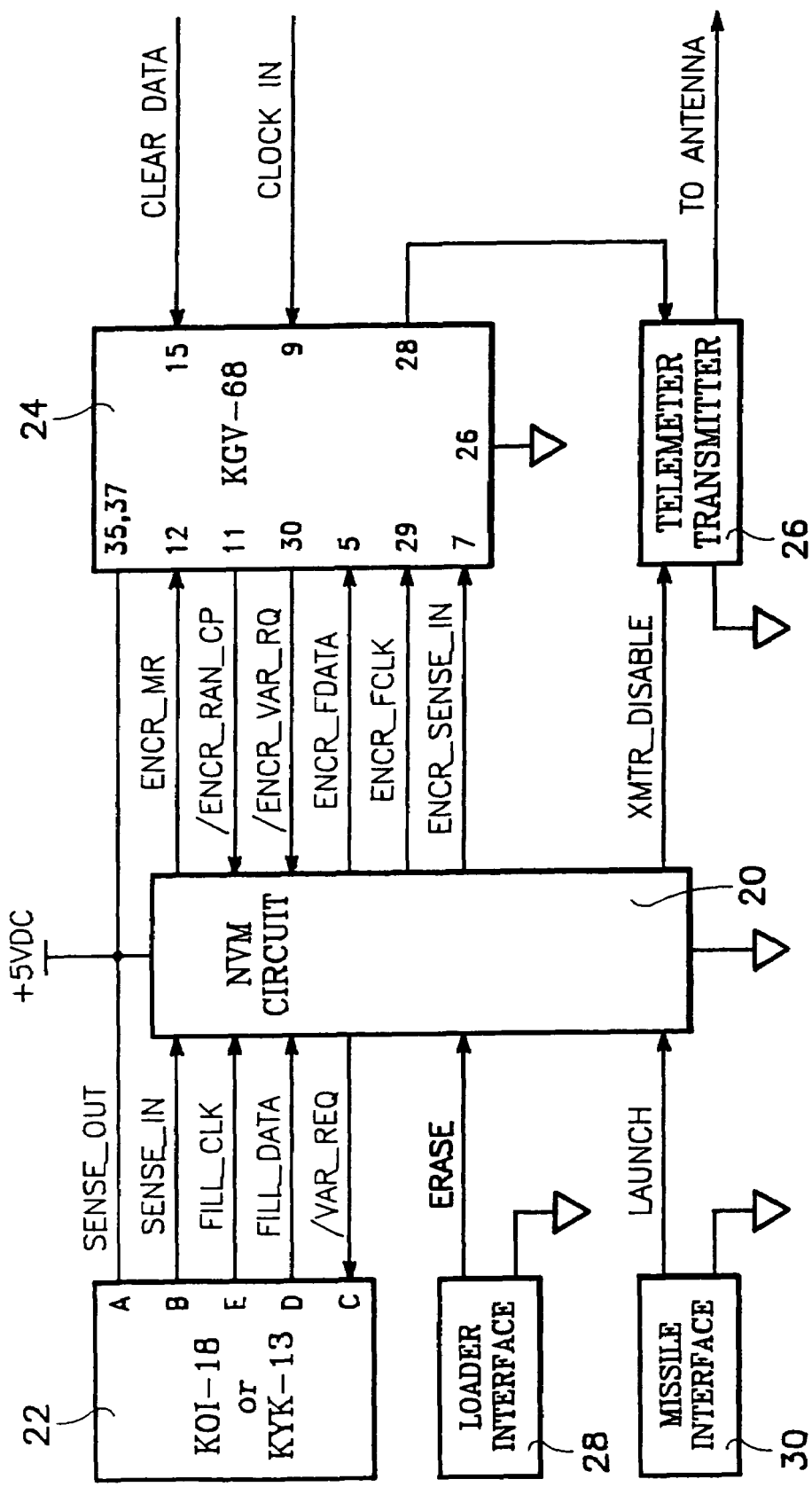
FIG. 1 is a block diagram illustrating a missile's telemetry encryption system and external key loader.
Figure 2:
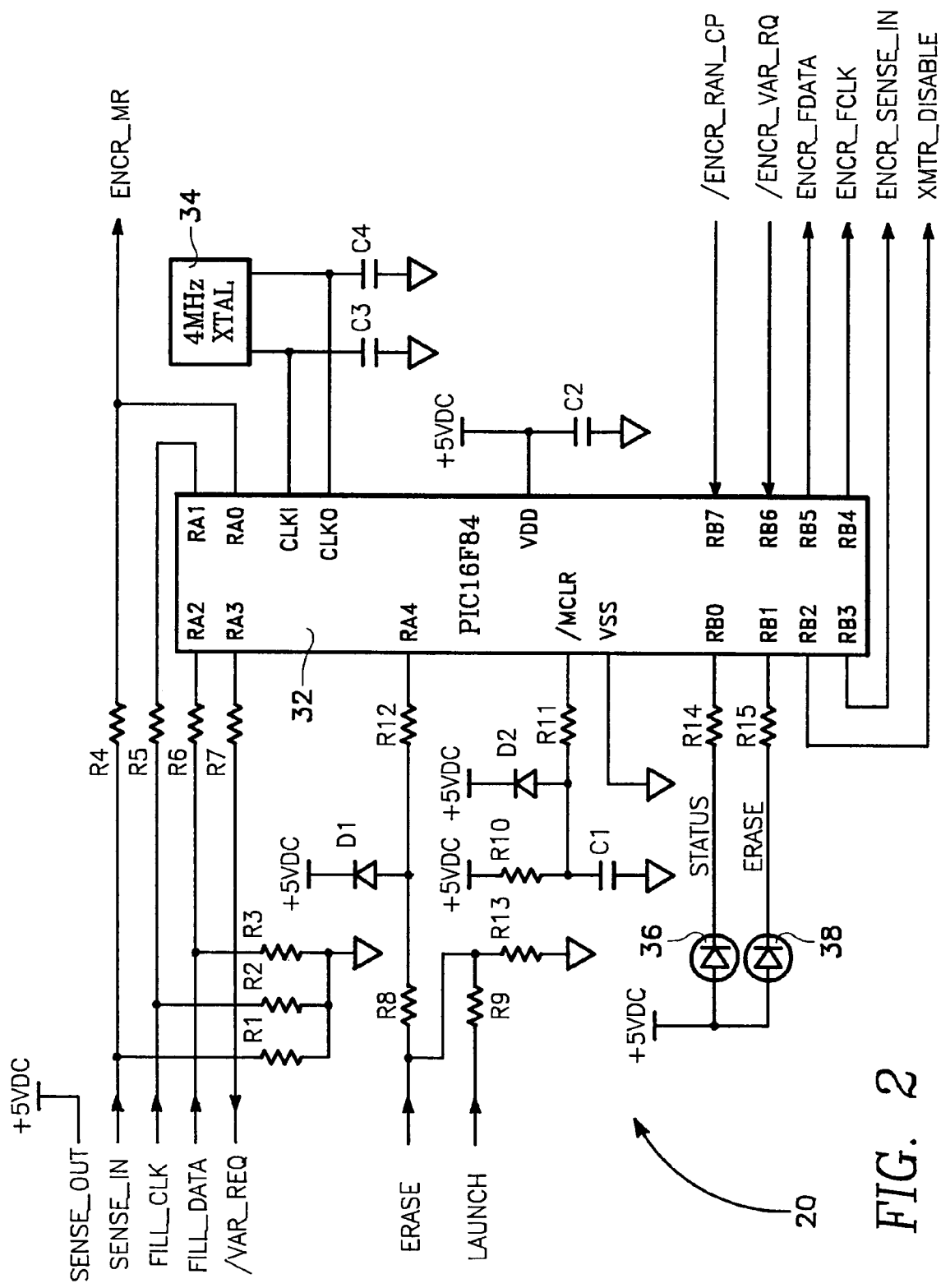
FIG. 2 is a detailed electrical diagram of the Non-Volatile Memory circuit of FIG. 1 which comprises the present invention.
Figure 3:
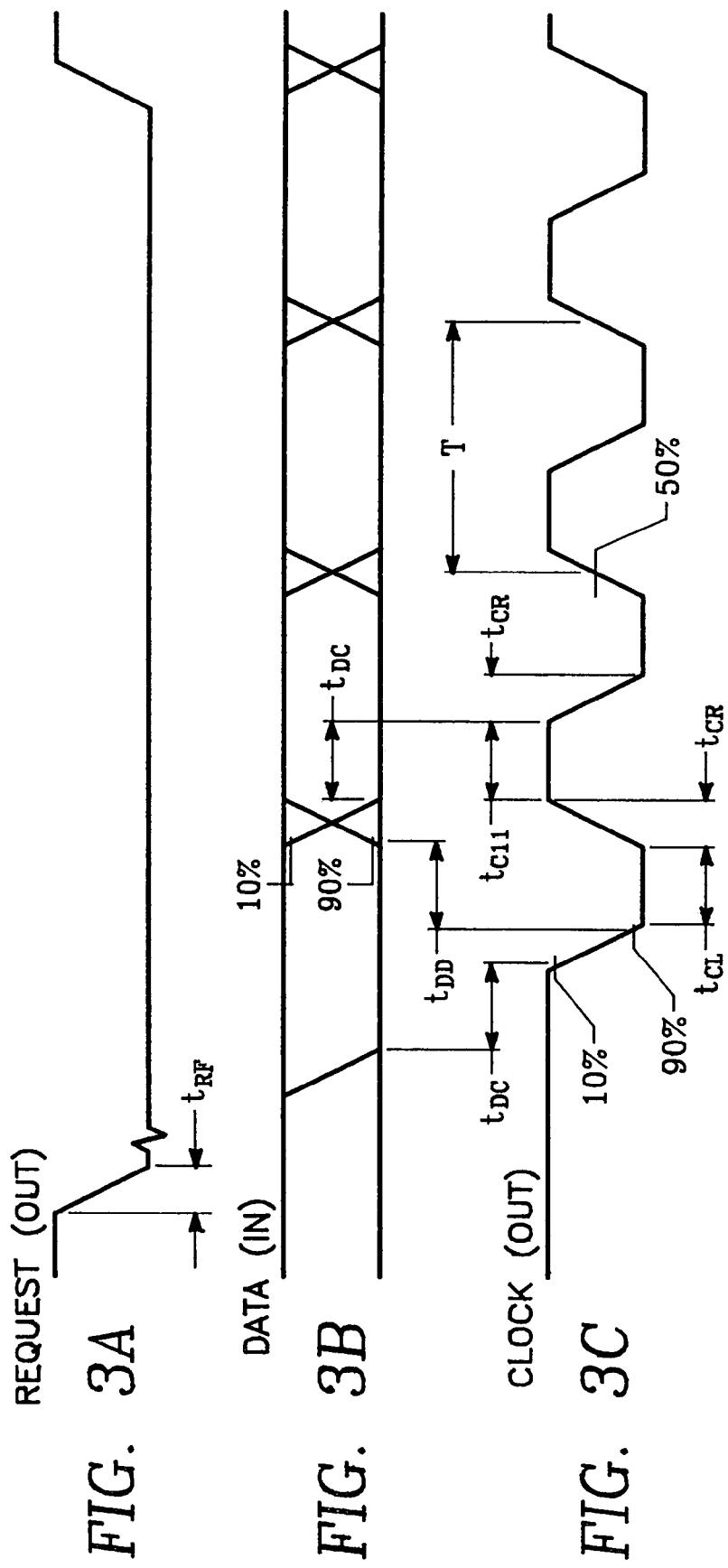
FIGS. 3A–3C illustrate timing and data waveforms associated with a data transfer between the key loader and the Non-Volatile Memory circuit of FIG. 1.

Referring to FIGS. 1 and 2, there is shown a missile's telemetry encryption system which includes a key loader 22 for loading a crypto key with its corresponding check word into a Non-Volatile Memory circuit 20. The key loader 22 may be either be a KOI-18 and a KYK-13 key loader. It should be noted that the KYK-13 key loader can store three crypto keys with their corresponding check words.

Non-Volatile Memory circuit 20 is connected to a KVG-68 encryption device 24 which allows Non-Volatile Memory circuit 20 to load a crypto key with its corresponding check word into the encryption device 24. The encryption device is connected to a telemeter transmitter 26 which transmits encrypted telemetry data from an encryption device 24 to a ground station.

As shown in FIG. 2, Non-Volatile Memory circuit 20 includes an 18-pin Flash/EEPROM 8-bit Microcontroller 32 which stores the crypto key and corresponding check word used by encryption device 24. The 18-pin Flash/EEPROM 8-bit microcontroller 32 used in the preferred embodiment of the present invention is a Model PIC16F84 commercially available from Microchip Technology Inc. of Phoenix, Ariz. Connected to microcontroller 32 is a 4 MHz clock signal generator 34 which supplies the master clock signal to microcontroller 32.

Figure 4:
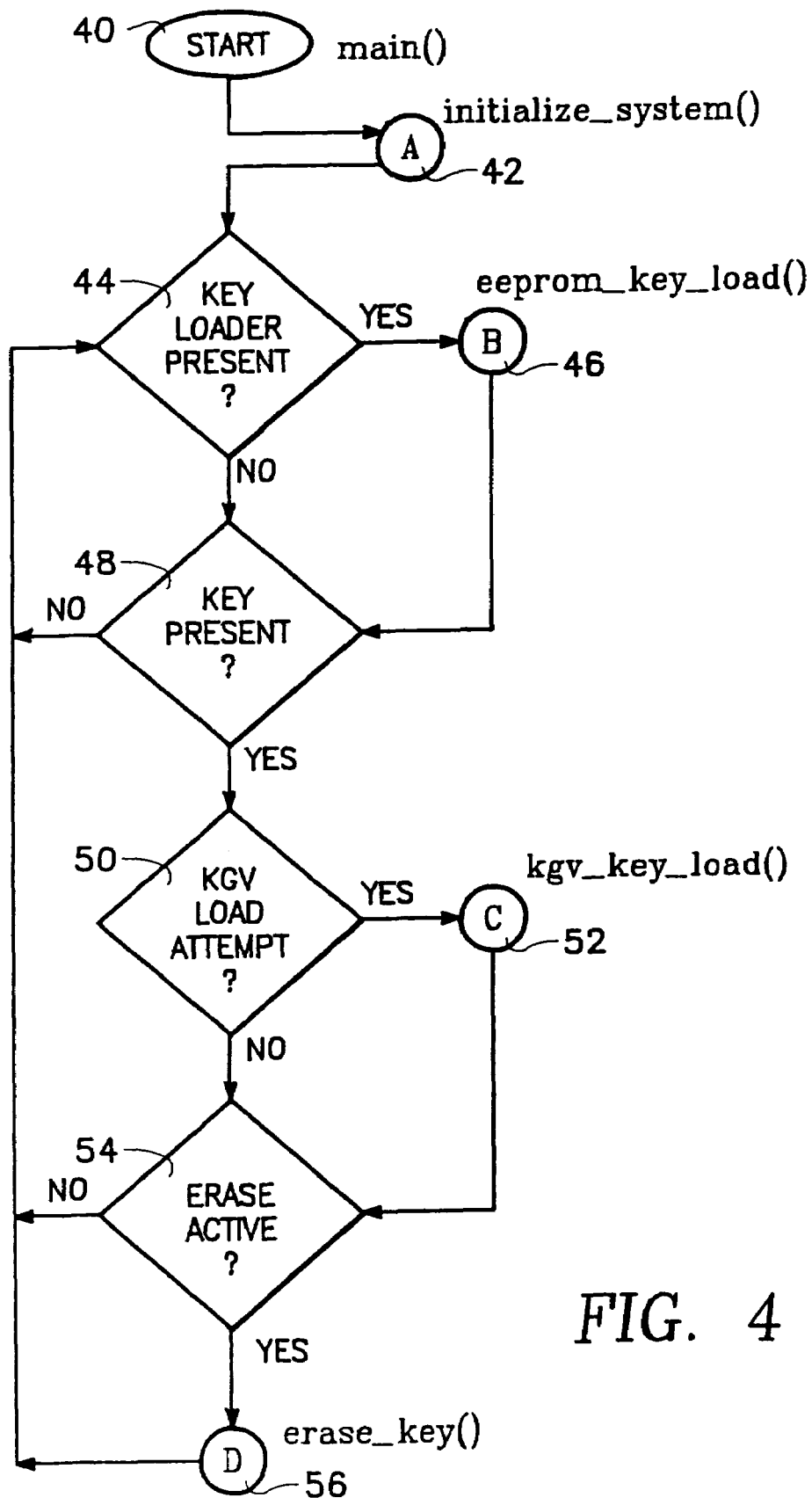
FIGS. 4–9 depicts a flow chart for the software used by the 8-bit microcontroller of FIG. 2 to load a crypto key with its corresponding check word into the encryption device of FIG. 1.

Referring to FIGS. 1, 2 and 4, a power up circuit comprising a pair of resistors R10 and R11, a diode D2 and a capacitor C1. When power is first applied to microcontroller 32 upon powering up Non-Volatile Memory circuit 20 a logic zero is supplied to the /MCLR input of microcontroller 32 clearing microcontroller 32. This logic zero then transitions to a logic one which results in microcontroller 32 executing the main routine (FIG. 4) of the computer software of Appendix A.

Figure 5:
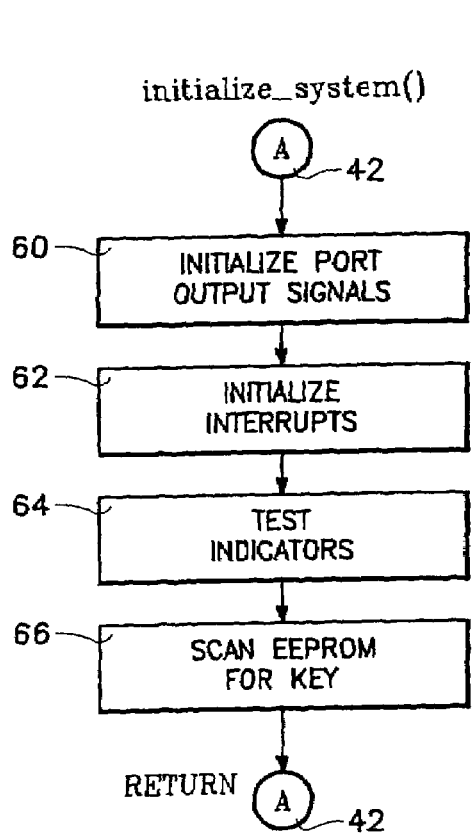
Figure 6:
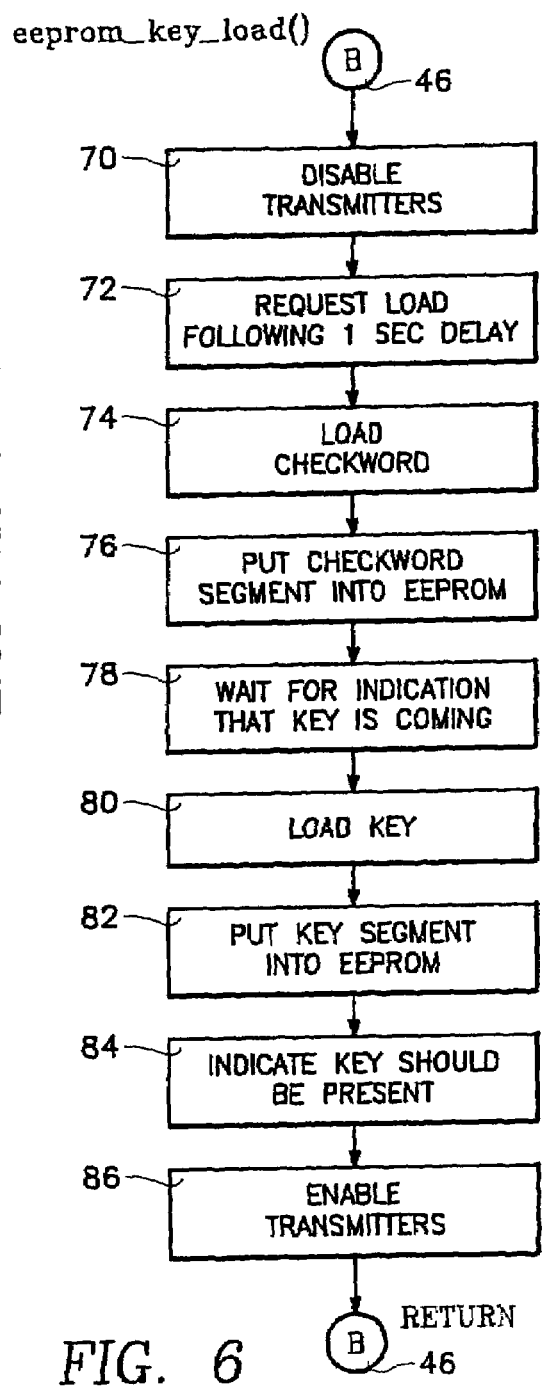

The main routine begins at program step 40, proceeding to program step 42 which is the initialize_system routine illustrated in FIG. 5 and also included in the nvmem.c module of the software of Appendix A. The initialize system routine sets all of the port output signals of microprocessor 32 to their initial condition (program step 60); initializes the interrupts for microprocessor 32 (program step 62) and initializes the test indicators LEDS 36 and 38 (program step 64). During program step 66 the EEPROM of microprocessor 32 is scanned to determined if a valid crypto key was previously loaded into the EEPROM of microprocessor 32. If a valid key is detected an internal flag is set which allows for a load of the key into encryption device 24 by the software of Appendix A.

During initialization the /VAR_REQ output from microprocessor 32 is set high since this signal is active low signal.

At this time it should be noted that the software of Appendix A is adapted for processing two KGV-68 although only one is illustrated in FIG. 1. In a security upgrade configuration the software operates in a manner which allows two KGV-68 encryption units to be loaded with a crypto key and its corresponding check word. It should be noted that while FIG. 1 only shows one KVG-68, the non-volatile memory comprising the present invention may be easily modified to accommodate to KVG-68 encryption units.

After initialization the ERASE output from microprocessor 32 is set high since this signal is an active low signal which turns off LED 38. After initialization the STATUS output from microprocessor 32 is also set high since this signal is an active low signal which turns off LED 36. During initialization of microcontroller 32 the ERASE output and STATUS output from microprocessor 32 are pulsed to test the operation of LEDS 36 and 38. Setting the ERASE output of microprocessor 32 high indicates that the crypto key has not been erased from microprocessor 32. Setting the STATUS output of microprocessor 32 high indicates that encryption device 24 is not loaded.

The XMTR_DISABLE output from microprocessor 32 is set high during initialization to disable transmitter 26. The ENCR_SENSE_IN output from microprocessor 32 is set low during initialization indicating that the KVG-68 encryption device 24 is not being loaded. The ENCR_FCLK and ENCR_FDATA outputs from microprocessor 32 are set high during initialization. The clock signal provided by microcontroller 32 at the ENCR_FCLK output from micrcontroller 32 has an active falling edge necessitating that the signal be set high during-initialization of micrcontroller 32. Setting-the ENCR_FDATA output from microprocessor 32 high results in "0" at the ENCR_FDATA output of microprocessor 32.

Referring to FIGS. 1, 2, 4 and 6, during program step 44, the software of Appendix A test for the presence of key loader 22. The SENSE_IN line is monitored by microcontroller 32 to determine the presence of key loader 22. When the SENSE_IN line is high resulting in a "1" at the RA0 input of microcontroller 32, the software of Appendix A proceeds to the eeprom_key_load routine of FIG. 6.

During program step 70 transmitter 26 is disabled by micrcontroller 32 to prevent possible transmission of the crypto key. During program step 72 the /VAR_REQ output from microprocessor 32 is set low to request the checkword from key loader 22. During program step 74 the checkword is loaded into the EEPROM of microcontroller 32. Program step 78 waits for indication that the key will be transferred from key loader 22 to the EEPROM of microcontroller 32 with the key being loaded into the EEPROM of mircontroller 32 during program step 82. Micrcontroller 32 and the software of Appendix A also duplicate the key and checkword in a backup location in the EEPROM of micrcontroller 32.

During program step 84 an indication is provided that the key is present by clearing the ERASE LED 36 turning off the ERASE LED 36. During program step 86, transmitter 26 is enabled by microcontroller 32. During program step 46, the software of Appendix A returns to the main program of FIG. 4.

During program step 48, the software of Appendix A checks for the presence of the key. If the key is not present, i.e. the key is not accurately read into microcontroller 32, the software returns to program step 44 to determine if the key loader 22 is present. When key loader 22 is present, the software of Appendix A will again load the key.

Figure 7:
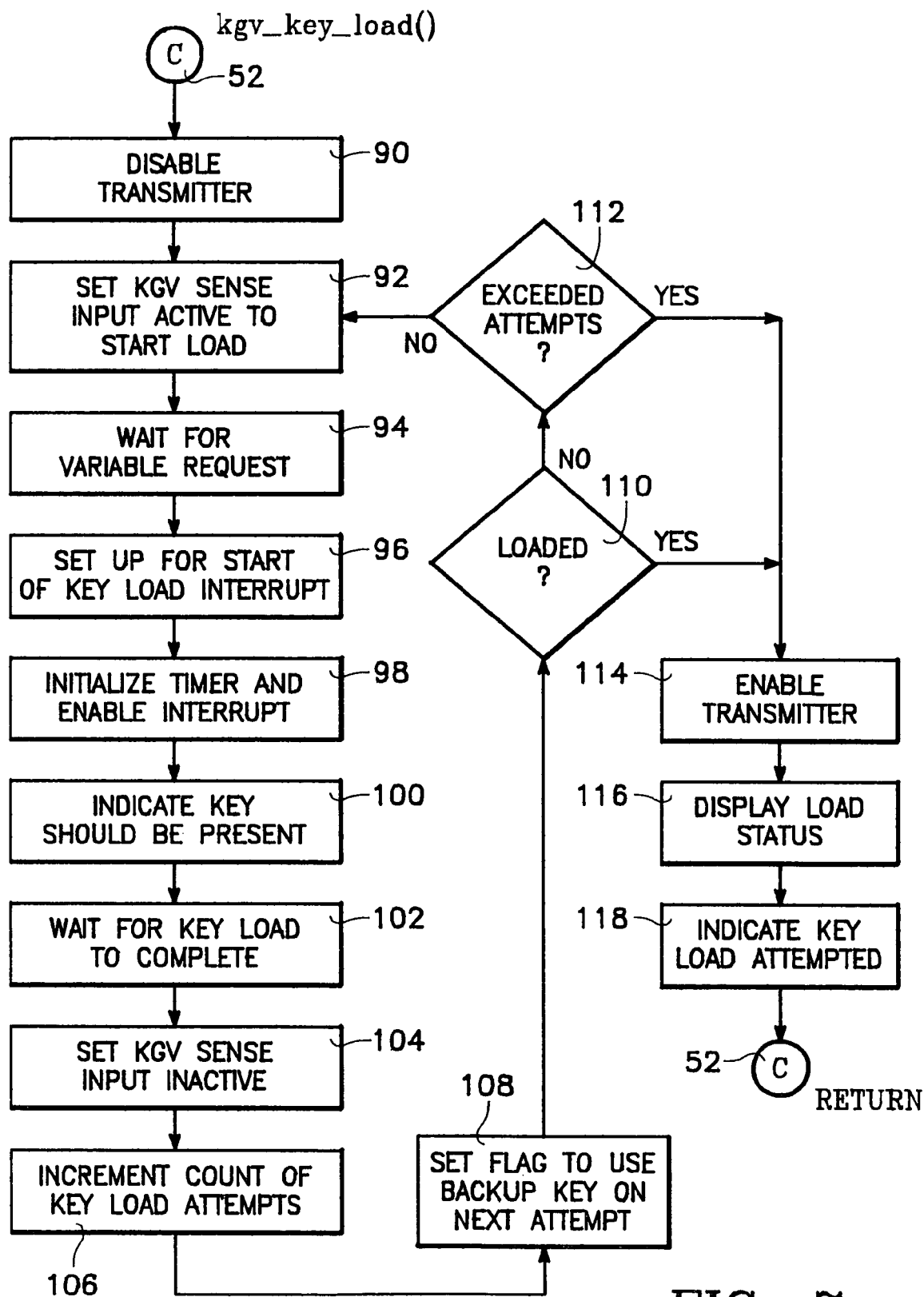

When the key is correctly loaded into mircontroller 32, the software of Appendix A proceeds to program step 50 which is the KGV load attempt decision. When a decision is made to load encryption unit 24, the software of Appendix A proceeds to the routine kgv_key_load of FIG. 7 (program step 52). During program step 90, transmitter 26 is disabled. During program step 92 the KGV sense input (ENCR_SENSE_IN) is set active, i.e. the logic "one" state, to start a load of the crypto key with its corresponding check word. Encryption unit 24 then responses with an active low variable request signal (/ENCR_VAR_RQ) to microcontroller 32 (program step 94). During program step 96, there is a set up for the start of the key load interrupt within microcontroller 32. During program step 98 an internal timer within microcontroller 32 is initialized and the key load interrupt is enabled for the key loading process.

During program step 100 there is an indication within mircontroller 32 that the key should be present. During program step 102 a wait routine occurs which allows for completion of the key load process. When the key load process is complete, which is an internal indication from the interrupt routine, the KGV sense input (ENCR_SENSE_IN) is set inactive, i.e. a logic "zero" state (program step 104).

During program step 106, the software of Appendix A increments the count to keep track of the key load attempts. During program step 108 the software of Appendix A sets a flag to use the backup key on the next attempt. A second crypto key with its corresponding check word are stored in the EEPROM of microcomputer 32. This backup key is utilized in the event that the primary key is not functional.

During program step 110, the software of Appendix A determines whether the key is loaded by testing random compare input (/ENCR_RAN_CP) to microcomputer 32. The answer will be no since there is a requirement that the routine kgv_key_load of FIG. 7 be processed twice to load the crypto key and the checkword into encryption device 24.

At this time it should be noted that the checkword is loaded first followed by the crypto key. During program step 112 the software of Appendix A determines whether there has been more than three attempts to load the checkword and the crypto key, which equates to six loops of the routine kgv_key_load of FIG. 7. If the answer is "yes" then transmitter 26 is enabled during program step 114. When this occurs the light emitting diode 36 will blink (program step 116) to indicate that microcontroller 32 has been unsuccessful in its attempt to load encryption device 24.

When a load of encryption device 24 is successful light emitting diode 36 remains on (program step 116). Program step 118 the software of Appendix A sets an internal flag indicating that a key load has been attempted. This prevents an inadvertent return to the routine kgv_key_load of FIG. 7.

The software of Appendix A next returns to main routine of FIG. 4. During program step 54, a determination is made as to whether or not the key should be erased. When the ERASE input to micrcontroller 32 is high (RA4 input to microcontroller 32), the microcontroller 32 erases the checkword and the crypto key as well as its backup from the EEPROM within microcontroller 32. Five random writes are performed within the EEPROM within microcontroller 32. This logic one signal, i.e. ERASE signal is provided by the loader interface 28 or the missile interface 30 to the RA4 input of micrcontroller 32. The signal provided by the missile interface 30 is substantially higher than the digital logic levels necessitating the use of additional resistor R9 in the LAUNCH line connecting missile interface 30 to microcontroller 32.

Figure 8:
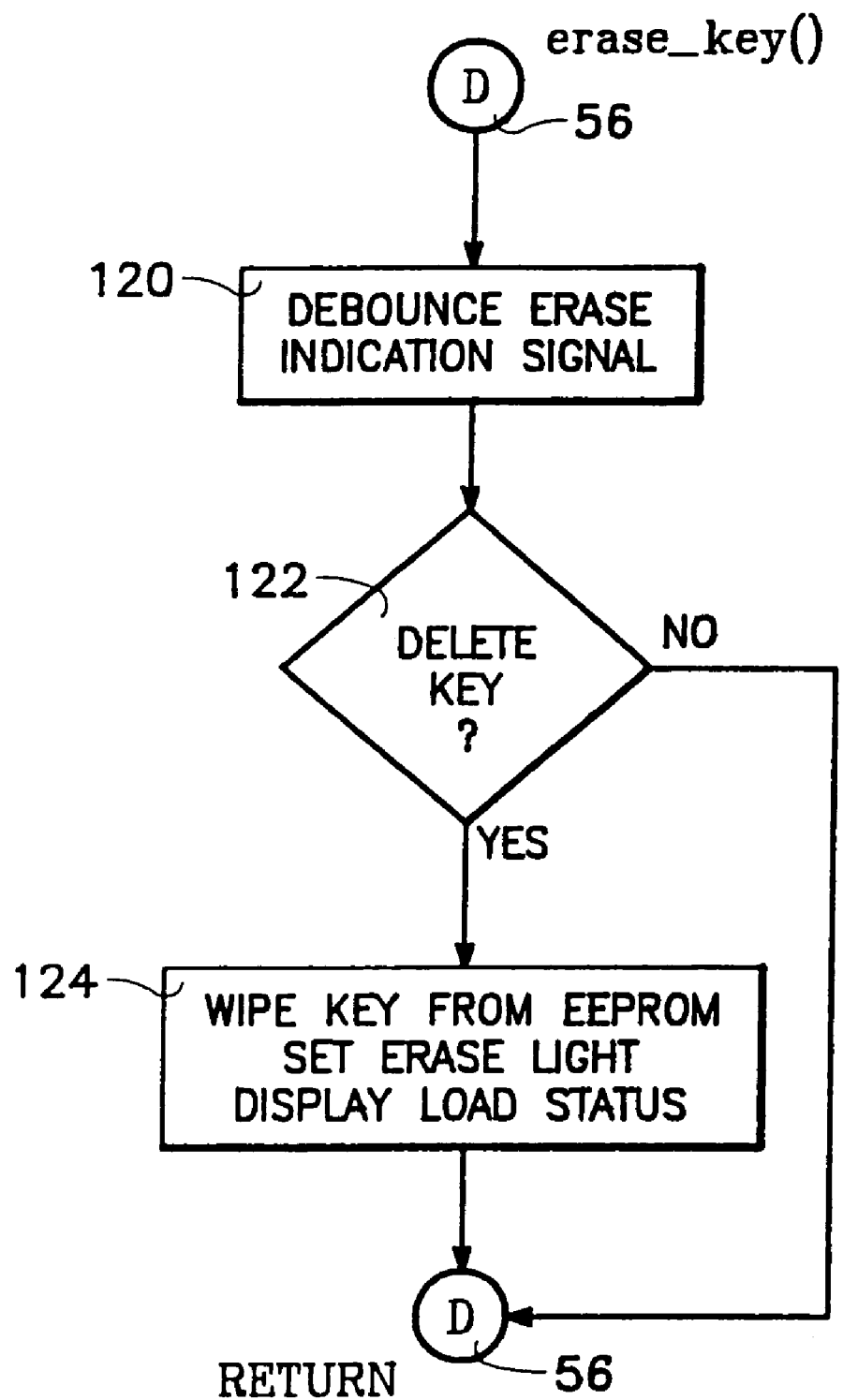
Figure 9:
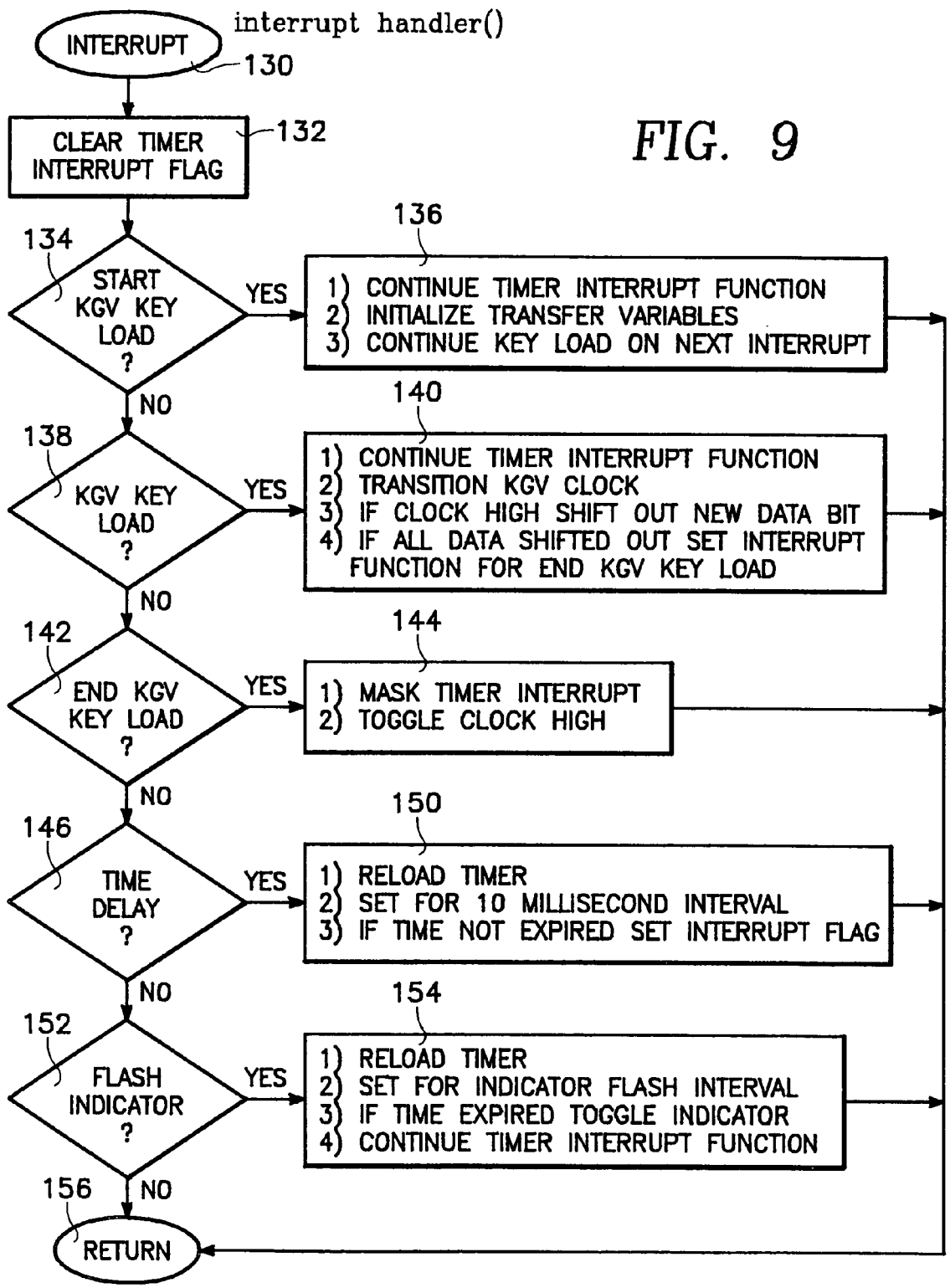

Referring to FIG. 8, the routine for erasing the EEPROM within microcontroller 32 is erase_key. Program step 120 debounces the erase indication signal provided to the RA4 input to microcontroller 32. Whenever the signal provided to the RA4 input to microcontroller 32 is a logic "one", the software of Appendix A proceeds to program step 124 erasing the crypto key with its corresponding check word from the EEPROM within microcontroller 32. The erase light, i.e. light emitting diode 38 is set, and the load status is displayed during program step 124.

From the foregoing, it may readily be seen that the present invention comprises a new, unique and exceedingly causeway mooring apparatus for use in non-volatile memory for use with an encryption device which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A method for providing a crypto key and an associated checkword of said crypto key to an encryption device for a telemeter system of a missile, comprising the steps of:
    (a) storing said crypto key and said associated checkword in a key loader;
    (b) sending a first variable request signal to said key loader to initiate a transfer of said crypto key and said associated checkword from said key loader to a microcontroller for storage within said microcontroller;
    (c) storing said crypto key and said associated checkword in an EEPROM within said microcontroller, said microcontroller containing a computer software program for controlling, handling and interpreting the transfer of said crypto key and said associated checkword from said key loader to said microcontroller, and the storing of said crypto key and said associated checkword in the EEPROM of said microcontroller;
    (d) sending a sense in signal to said encryption device to initiate a load of said crypto key and said associated checkword into said encryption device;
    (e) receiving a second variable request signal from said encryption device to initiate a transfer and download of said crypto key and said associated checkword from the EEPROM of said microcontroller to said encryption device;
    (f) loading said crypto key and said associated checkword into said encryption device, said computer software program controlling, handling and interpreting the transfer and download of said crypto key and said associated checkword into said encryption device from the EEPROM of said micrcontroller;
    (g) providing a transmitter disable signal to a transmitter for the telemeter system of said missile to disable said transmitter when said crypto key and said associated checkword are being loaded into said encryption device preventing said crypto key and said associated checkword from being transmitted by said transmitter; and
    (h) enabling said transmitter after a successful load of said crypto key and said associated checkword into said encryption device, said computer software program controlling, handling and interpreting the disabling of said transmitter when said crypto key and said associated checkword are loaded into said encryption device and an enabling of said transmitter after the successful load of said crypto key and said associated checkword into said encryption device.

2. The method of claim 1 wherein said Microcontroller comprises an 8-bit microcontroller.

3. The method of claim 1 further comprising the step of displaying a status for the transfer and download of said crypto key and said associated checkword into said encryption device wherein a light emitting diode displays the status for the transfer and download of said crypto key and said associated checkword into said encryption device.

4. The method of claim 1 further comprising the step of providing a launch signal from a missile interface within said missile to said microcontroller upon a launch of said missile, said microcontroller, responsive to said launch signal, erasing said crypto key and said associated checkword from the EEPROM of said microcontroller.

5. The method of claim 4 further comprising the step of displaying a status for an erase of said crypto key and said associated checkword from the EEPROM of said microcontroller, wherein a light emitting diode displays the status for the erase of said crypto key and said associated checkword from the EEPROM of said microcontroller.

6. The method of claim 1 wherein said computer software program includes an eeprom key load routine which instructs said microcontroller to disable said transmitter prior to the transfer of said crypto key and said associated checkword from said key loader to said microcontroller, said eeprom key load routine instructing said microcontroller to set a /VAR_REQ output from said microcontroller low to request said associated checkword from said key loader, and to load said associated checkword into the EEPROM of said microcontroller, said eeprom key load routine instructing said microcontroller to wait for an indication that said crypto key will be transferred from said key loader to the EEPROM of said microcontroller and to load said crypto key into the EEPROM of said micrcontroller when said crypto key is transferred from said key loader to said micrcontroller, said eeprom routine instructing said micrcontroller to generate a duplicate of said crypto key and said associated checkword and store the duplicate of said crypto key and said associated checkword in a backup location in the EEPROM of said micrcontroller, and said eeprom key load routine instructing said micrcontroller to enable said transmitter after the duplicate of said crypto key and said associated checkword is stored in the EEPROM of said micrcontroller.

7. The method of claim 1 wherein said computer software program includes a key load routine which instructs said microcontroller to generate a disable signal to disable said transmitter prior to loading said encryption device, and an active high logic signal which is provided to said encryption device to initiate the load of said crypto key and said associated checkword into said encryption device, said key load routine instructing said microcontroller to generate an inactive low logic signal which is provided to said encryption device to indicate to said encryption device that the load of said crypto key and said associated checkword into said encryption device is complete, and an enable signal to enable said transmitter after completion of the load of said crypto key and said associated checkword into said encryption device, and said key load routine instructing said microcontroller to provide a load status signal to a light emitting diode to activate said light emitting diode, said light emitting diode displaying the load status for the transfer and download of said crypto key and said associated checkword into said encryption device from the EEPROM of said micrcontroller.

8. The method of claim 1 further comprising the step of receiving an erase signal from a loader interface within said missile, said microcontroller, responsive to said erase signal, erasing said crypto key and said associated checkword from the EEPROM of said microcontroller.

9. The method of claim 1 wherein said computer software program includes an erase routine which instructs said microcontroller to monitor an erase indication signal provided to an RA4 input of said microcontroller such that when said erase indication signal provided to the RA4 input said microcontroller is a logic one, said computer software program instructs said microcontroller to erase said crypto key and said associated checkword from the EEPROM within said microcontroller, the erase routine of said computer software program instructing said microcontroller to set a light emitting diode to display a status of a deletion of said crypto key and said associated checkword from the EEPROM within said microcontroller.

10. The method of claim 1 wherein said computer software program includes an interrupt routine, said interrupt routine providing an internal indication to said microprocessor that the download of said crypto key and said associated checkword to said encryption device is complete, said interrupt routine instructing said microprocessor to set a KGV sense input for said encryption device to a logic zero state indicating to said encryption device that the download of said crypto key and said associated checkword to said encryption device is complete.

11. A method for providing a crypto key and an associated checkword of said crypto key to an encryption device for a telemeter system of a missile, comprising the steps of:
 (a) storing said crypto key and said associated checkword in a key loader;
 (b) sending a first variable request signal to said key loader to initiate a transfer of said crypto key and said associated checkword from said key loader to a microcontroller for storage within said microcontroller;
 (c) storing said crypto key and said associated checkword in an EEPROM within said microcontroller, said microcontroller containing a computer software program for controlling, handling and interpreting the transfer of said crypto key and said associated checkword from said key loader to said microcontroller, and the storing of said crypto key and said associated checkword in the EEPROM of said microcontroller;
 (d) sending a sense in signal to said encryption device to initiate a load of said crypto key and said associated checkword into said encryption device;
 (e) receiving a second variable request signal from said encryption device to initiate a transfer and download of said crypto key and said associated checkword from the EEPROM of said microcontroller to said encryption device;
 (f) loading said crypto key and said associated checkword into said encryption device, said computer software program controlling, handling and interpreting the transfer and download of said crypto key and said associated checkword into said encryption device from the EEPROM of said micrcontroller;
 (g) providing a transmitter disable signal to a transmitter for the telemeter system of said missile to disable said transmitter when said crypto key and said associated checkword are being loaded into said encryption device preventing said crypto key and said associated checkword from being transmitted by said transmitter; and
 (h) enabling said transmitter after a successful load of said crypto key and said associated checkword into said encryption device, said computer software program controlling, handling and interpreting the disabling of said transmitter when said crypto key and said associated checkword are loaded into said encryption device and an enabling of said transmitter after the successful load of said crypto key and said associated checkword into said encryption device;
 (i) displaying a load status for the transfer and download of said crypto key and said associated checkword into said encryption device wherein a first light emitting diode displays the status for the transfer and download of said crypto key and said associated checkword into said encryption device, said computer software program controlling, handling and interpreting the load status of said crypto key and said associated checkword into said encryption device as displayed by said first light emitting diode;
 (j) providing a launch signal from a missile interface within said missile to said microcontroller upon a launch of said missile, said microcontroller, responsive to said launch signal, erasing said crypto key and said associated checkword from the EEPROM of said microcontroller; and
 (k) displaying an erase status for said crypto key and said associated checkword from the EEPROM of said microcontroller, wherein a second light emitting diode displays the status for the deletion of said crypto key and said associated checkword from the EEPROM of said microcontroller, said computer software program controlling, handling and interpreting the erase status for said crypto key and said associated checkword from the EEPROM of said microcontroller as displayed by said second light emitting.

12. The method of claim 11 wherein said computer software program includes an eeprom key load routine which instructs said microcontroller to disable said transmitter prior to the transfer of said crypto key and said associated checkword from said key loader to said microcontroller, said eeprom key load routine instructing said microcontroller to set a /VAR_REQ output from said microcontroller low to request said associated checkword from said key loader, and to load said associated checkword into the EEPROM of said microcontroller, said eeprom key load routine instructing said microcontroller to wait for an indication that said crypto key will be transferred from said key loader to the EEPROM of said microcontroller and to load said crypto key into the EEPROM of said micrcontroller when said crypto key is transferred from said key loader to said micrcontroller, said eeprom routine instructing said micrcontroller to generate a duplicate of said crypto key and said associated checkword and store the duplicate of said crypto key and said associated checkword in a backup location in the EEPROM of said micrcontroller, and said eeprom key load routine instructing said micrcontroller to enable said transmitter after the duplicate of said crypto key and said associated checkword is stored in the EEPROM of said micrcontroller.

13. The method of claim 11 wherein said computer software program includes a key load routine which instructs said microcontroller to generate a disable signal to disable said transmitter prior to loading said encryption device, and an active high logic signal which is provided to said encryption device to initiate the load of said crypto key and said associated checkword into said encryption device, said key load routine instructing said microcontroller to generate an inactive low logic signal which is provided to said encryption device to indicate to said encryption device that the load of said crypto key and said associated checkword into said encryption device is complete, and an enable signal to enable said transmitter after completion of the load of said crypto key and said associated checkword into said encryption device, and said key load routine instructing said microcontroller to provide a load status signal to said first light emitting diode to activate said first light emitting diode, said first light emitting diode displaying the status of the transfer and download of said crypto key and said associated checkword into said encryption device from the EEPROM of said micrcontroller.

14. The method of claim 11 wherein said computer software program includes an erase routine which instructs said microcontroller to monitor an erase indication signal provided to an RA4 input of said microcontroller such that when said erase indication signal provided to the RA4 input said microcontroller is a logic one, said computer software program instructs said microcontroller to erase said crypto key and said associated checkword from the EEPROM within said microcontroller, the erase routine of said computer software program instructing said microcontroller to set said second light emitting diode to display the erase status of said crypto key and said associated checkword from the EEPROM within said microcontroller.

15. The method of claim 11 wherein said computer software program includes an interrupt routine, said interrupt routine providing an internal indication to said microprocessor that the download of said crypto key and said associated checkword to said encryption device is complete, said interrupt routine instructing said microprocessor to set a KGV sense input for said encryption device to a logic zero state indicating to said encryption device that the download of said crypto key and said associated checkword to said encryption device is complete.

16. A method for providing a crypto key and an associated checkword of said crypto key to an encryption device for a telemeter system of a missile, comprising the steps of:

(a) storing said crypto key and said associated checkword in a key loader;

(b) sending a first variable request signal to said key loader to initiate a transfer of said crypto key and said associated checkword from said key loader to a microcontroller for storage within said microcontroller;

(c) storing said crypto key and said associated checkword in an EEPROM within said microcontroller, said microcontroller containing a computer software program for controlling, handling and interpreting the transfer of said crypto key and said associated checkword from said key loader to said microcontroller, and the storing of said crypto key and said associated checkword in the EEPROM of said microcontroller;

(d) sending a sense in signal to said encryption device to initiate a load of said crypto key and said associated checkword into said encryption device;

(e) receiving a second variable request signal from said encryption device to initiate a transfer and download of said crypto key and said associated checkword from the EEPROM of said microcontroller to said encryption device;

(f) loading said crypto key and said associated checkword into said encryption device, said computer software program controlling, handling and interpreting the transfer and download of said crypto key and said associated checkword into said encryption device from the EEPROM of said micrcontroller;

(g) providing a transmitter disable signal to a transmitter for the telemeter system of said missile to disable said transmitter when said crypto key and said associated checkword are being loaded into said encryption device preventing said crypto key and said associated checkword from being transmitted by said transmitter; and (h) enabling said transmitter after a successful load of said crypto key and said associated checkword into said encryption device, said computer software program controlling, handling and interpreting the disabling of said transmitter when said crypto key and said associated checkword are loaded into said encryption device and an enabling of said transmitter after the successful load of said crypto key and said associated checkword into said encryption device;

(i) displaying a load status for the transfer and download of said crypto key and said associated checkword into said encryption device wherein a first light emitting diode displays the status for the transfer and download of said crypto key and said associated checkword into said encryption device, said computer software program controlling, handling and interpreting the load status of said crypto key and said associated checkword into said encryption device as displayed by said first light emitting diode;

(j) providing a launch signal from a missile interface within said missile to said microcontroller upon a launch of said missile, said microcontroller, responsive to said launch signal, erasing said crypto key and said associated checkword from the EEPROM of said microcontroller;

(k) displaying an erase status for said crypto key and said associated checkword from the EEPROM of said microcontroller, wherein a second light emitting diode displays the status for the deletion of said crypto key and said associated checkword from the EEPROM of said microcontroller, said computer software program controlling, handling and interpreting the erase status for said crypto key and said associated checkword from the EEPROM of said microcontroller as displayed by said second light emitting; and (l) receiving an erase signal from a loader interface within said missile, said microcontroller, responsive to said erase signal, erasing said crypto key and said associated checkword from the EEPROM of said microcontroller.

17. The method of claim 16 wherein said computer software program includes an eeprom key load routine which instructs said microcontroller to disable said transmitter prior to the transfer of said crypto key and said associated checkword from said key loader to said microcontroller, said eeprom key load routine instructing said microcontroller to set a /VAR_REQ output from said microcontroller low to request said associated checkword from said key loader, and to load said associated checkword into the EEPROM of said microcontroller, said eeprom key load routine instructing said microcontroller to wait for an indication that said crypto key will be transferred from said key loader to the EEPROM of said microcontroller and to load said crypto key into the EEPROM of said micrcontroller when said crypto key is transferred from said key loader to said micrcontroller, said eeprom routine instructing said micrcontroller to generate a duplicate of said crypto key and said associated checkword and store the duplicate of said crypto key and said associated checkword in a backup location in the EEPROM of said micrcontroller, and said eeprom key load routine instructing said micrcontroller to enable said transmitter after the duplicate of said crypto key and said associated checkword is stored in the EEPROM of said micrcontroller.

18. The method of claim 16 wherein said computer software program includes a key load routine which instructs said microcontroller to generate a disable signal to disable said transmitter prior to loading said encryption device, and an active high logic signal which is provided to said encryption device to initiate the load of said crypto key and said associated checkword into said encryption device, said key load routine instructing said microcontroller to generate an inactive low logic signal which is provided to said encryption device to indicate to said encryption device that the load of said crypto key and said associated checkword into said encryption device is complete, and an enable signal to enable said transmitter after completion of the load of said crypto key and said associated checkword into said encryption device, and said key load routine instructing said microcontroller to provide a load status signal to said first light emitting diode to activate said first light emitting diode, said first light emitting diode displaying the status of the transfer and download of said crypto key and said associated checkword into said encryption device from the EEPROM of said micrcontroller.

19. The method of claim 16 wherein said computer software program includes an erase routine which instructs said microcontroller to monitor an erase indication signal provided to an RA4 input of said microcontroller such that when said erase indication signal provided to the RA4 input said microcontroller is a logic one, said computer software program instructs said microcontroller to erase said crypto key and said associated checkword from the EEPROM within said microcontroller, the erase routine of said computer software program instructing said microcontroller to set said second light emitting diode to display the erase status of said crypto key and said associated checkword from the EEPROM within said microcontroller.

20. The method of claim 16 wherein said computer software program includes an interrupt routine, said interrupt routine providing an internal indication to said microprocessor that the download of said crypto key and said associated checkword to said encryption device is complete, said interrupt routine instructing said microprocessor to set a KGV sense input for said encryption device to a logic zero state indicating to said encryption device that the download of said crypto key and said associated checkword to said encryption device is complete.

* * * * *